(12) United States Patent
Luescher et al.

(10) Patent No.: US 10,639,780 B2
(45) Date of Patent: May 5, 2020

(54) OSCILLATORY DRIVING DEVICE

(71) Applicant: Robert Bosch GmbH, Stuttgart (DE)

(72) Inventors: Bruno Luescher, Zofingen (CH); Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 15/323,412

(22) PCT Filed: Jun. 5, 2015

(86) PCT No.: PCT/EP2015/062580
§ 371 (c)(1),
(2) Date: Dec. 31, 2016

(87) PCT Pub. No.: WO2016/000904
PCT Pub. Date: Jan. 7, 2016

(65) Prior Publication Data
US 2017/0151658 A1 Jun. 1, 2017

(30) Foreign Application Priority Data
Jul. 2, 2014 (DE) .................. 10 2014 212 794

(51) Int. Cl.
*B25F 5/00* (2006.01)
*B27B 19/00* (2006.01)
(Continued)

(52) U.S. Cl.
CPC .............. *B25F 5/001* (2013.01); *B24B 23/04* (2013.01); *B24B 27/08* (2013.01); *B24B 47/12* (2013.01);
(Continued)

(58) Field of Classification Search
CPC ....... B27B 19/006; F16H 21/40; F16H 25/16; F16H 37/122; F16H 37/124; B24B 23/04; B24B 47/12; Y10T 74/18056
(Continued)

(56) References Cited

U.S. PATENT DOCUMENTS 3,505,733 A * 4/1970 Holden .................. B23Q 5/027
30/166.3
5,768,933 A * 6/1998 Tanner .................. B27B 19/006
30/218
(Continued)

FOREIGN PATENT DOCUMENTS

CN 101663130 A 3/2010
CN 101909815 A 12/2010
(Continued)

OTHER PUBLICATIONS

International Search Report corresponding to PCT Application No. PCT/EP2015/062580, dated Sep. 2, 2015 (German and English language document) (5 pages).

*Primary Examiner* — Alex M Valvis
*Assistant Examiner* — Daniel Jeremy Leeds
(74) *Attorney, Agent, or Firm* — Maginot, Moore & Beck LLP

(57) ABSTRACT

An oscillatory driving device for a hand-held power tool includes at least one input shaft, at least one output shaft, and at least one gearing unit. The gearing unit operatively connects the input shaft to the output shaft and includes at least one eccentric element configured to drive the output shaft in an oscillatory manner. The gearing unit includes at least one further eccentric element configured to drive the output shaft in an oscillatory manner.

13 Claims, 6 Drawing Sheets

(51) Int. Cl.
  *B24B 23/04*   (2006.01)
  *B24B 47/12*   (2006.01)
  *B24B 47/16*   (2006.01)
  *B24B 27/08*   (2006.01)
  *F16H 21/40*   (2006.01)
  *F16F 15/22*   (2006.01)
  *F16H 25/16*   (2006.01)

(52) U.S. Cl.
  CPC .............. *B24B 47/16* (2013.01); *B25F 5/006* (2013.01); *B27B 19/006* (2013.01); *F16F 15/22* (2013.01); *F16H 21/40* (2013.01); *F16H 25/16* (2013.01)

(58) Field of Classification Search
  USPC ................ 74/25, 22 A, 24, 26, 33, 41, 55, 6
  See application file for complete search history.

(56) References Cited

U.S. PATENT DOCUMENTS

| | | | | |
|---|---|---|---|---|
| 5,778,727 | A * | 7/1998 | Richardson | A01D 34/30 |
| | | | | 56/296 |
| 8,381,833 | B2 * | 2/2013 | Bernardi | B25B 28/00 |
| | | | | 173/162.1 |
| 9,516,423 | B2 * | 12/2016 | Daley | B81B 3/007 |
| 10,150,210 | B2 * | 12/2018 | Rubens | B25F 5/00 |
| 2005/0283175 | A1 * | 12/2005 | Tanner | B27B 5/30 |
| | | | | 606/178 |
| 2010/0236806 | A1 * | 9/2010 | Heilig | B24B 41/042 |
| | | | | 173/217 |
| 2011/0017483 | A1 * | 1/2011 | Baumann | B25D 11/062 |
| | | | | 173/162.2 |
| 2011/0036609 | A1 * | 2/2011 | Blickle | B24B 23/028 |
| | | | | 173/213 |
| 2011/0266758 | A1 * | 11/2011 | Sergyeyenko | B24B 23/04 |
| | | | | 279/106 |
| 2012/0067607 | A1 * | 3/2012 | Weber | B24B 23/04 |
| | | | | 173/216 |
| 2012/0170976 | A1 * | 7/2012 | Cai | B27B 5/32 |
| | | | | 403/359.1 |
| 2012/0292864 | A1 * | 11/2012 | Zhou | B27B 5/32 |
| | | | | 279/141 |
| 2013/0037290 | A1 * | 2/2013 | Clabunde | B25F 5/006 |
| | | | | 173/162.1 |
| 2013/0269963 | A1 * | 10/2013 | Fuchs | B23D 61/006 |
| | | | | 173/162.1 |
| 2014/0020918 | A1 * | 1/2014 | Klabunde | B23D 47/12 |
| | | | | 173/49 |
| 2014/0182872 | A1 * | 7/2014 | Rubens | B27B 19/006 |
| | | | | 173/213 |
| 2014/0190715 | A1 * | 7/2014 | Wong | B25B 21/00 |
| | | | | 173/39 |
| 2015/0075830 | A1 * | 3/2015 | Zhang | B24B 23/04 |
| | | | | 173/213 |
| 2015/0135541 | A1 * | 5/2015 | Wierzchon | B27B 19/006 |
| | | | | 30/276 |
| 2016/0221175 | A1 * | 8/2016 | Aoki | B23D 51/10 |
| 2016/0271711 | A1 * | 9/2016 | Qian | B27B 19/006 |
| 2016/0290453 | A1 * | 10/2016 | Rubens | B27B 19/006 |

FOREIGN PATENT DOCUMENTS

| | | |
|---|---|---|
| CN | 101992459 A | 3/2011 |
| CN | 106573388 A | 4/2017 |
| DE | 35 43 43 C | 6/1922 |
| DE | 102 20 325 A1 | 11/2003 |
| DE | 10 2007 018 466 A1 | 10/2008 |
| DE | 20 2009 011 312 U1 | 1/2011 |
| DE | 10 2010 039 787 A1 | 3/2012 |
| EP | 2 594 364 A1 | 5/2013 |

* cited by examiner

OSCILLATORY DRIVING DEVICE

This application is a 35 U.S.C. § 371 National Stage Application of PCT/EP2015/062580, filed on Jun. 5, 2015, which claims the benefit of priority to Serial No. DE 10 2014 212 794.7, filed on Jul. 2, 2014 in Germany, the disclosures of which are incorporated herein by reference in their entirety.

BACKGROUND

An oscillatory driving device for a hand-held power tool, having at least one input shaft, having at least one output shaft, and having at least one gearbox unit, operatively connecting the input shaft to the output shaft, which comprises at least one eccentric element for driving the output shaft in an oscillatory manner, has already been proposed.

SUMMARY

The disclosure proceeds from an oscillatory driving device for a hand-held power tool, having at least one input shaft, having at least one output shaft, and having at least one gearbox unit, operatively connecting the input shaft to the output shaft, which comprises at least one eccentric element for driving the output shaft in an oscillatory manner.

It is proposed that the gearbox unit comprises at least one further eccentric element for driving the output shaft in an oscillatory manner. The at least two eccentric elements of the gearbox unit are in each case provided for driving the output shaft in an oscillatory manner. In this context, an "oscillatory driving device" is to be understood as being a device which is provided for generating a reciprocating movement of an element, in particular of the output shaft of the device, about an axis in a defined angular range, resulting from a driving force and/or a driving torque. Preferably, at least one driving element, in particular the input shaft of the oscillatory driving device, is rotationally driven by means of a drive unit of the hand-held power tool. The drive unit is preferably configured as an electric motor. However, it is also conceivable that the drive unit is configured as fluidic drive unit, as a combustion-type drive unit, as a hybrid drive unit, etc. Furthermore, a "hand-held power tool" in this context is to be understood as being in particular a workpiece-processing machine, advantageously however a power drill, a power drill and/or impact drill, a saw, a plane, a screwdriver, a mortiser/router, a grinder an angular grinder, a gardening tool, and/or a multi-functional tool. Furthermore, an "eccentric element" in this context is to be understood as being in particular an element that, when rotated about a rotation axis, on an external face that faces away from the rotation axis is provided to exert a force on a third element, wherein a spacing between the rotation axis and the external faces along a circumferential direction is non-uniform. Preferably, this is in particular to be understood as being a disk-shaped component of which the center and, preferably also the center of gravity, is/are disposed so as to be spaced apart from a rotation axis of the component. A "disk-shaped component" is to be understood as being in particular a component of which the material extent in the radial direction is at least 10% of a diameter of the component, wherein an axial extent of the component is preferably less than 10% of the diameter. An eccentric element being provided "for driving the output shaft in an oscillatory manner" in this context is to be understood to mean in particular that a force that acts from the eccentric element directly on a further element is at least almost directly utilized for driving the output shaft. Preferably, this is to be understood to mean in particular that the force that the eccentric element on an external face that faces away from the rotation axis exerts on a further element is transmitted at least almost without losses to the output shaft. Herein, "at least almost without losses" is to be understood to mean in particular that at least 60%, preferably at least 75%, and particularly preferably at least 90% of the force is transmitted to the output shaft. "Provided" is to be understood to mean in particular specially conceived and/or equipped. An object being provided for a specific function is to be understood to mean in particular that the object fulfils and/or carries out this specific function in at least one application and/or operating state.

Reliable oscillatory driving of the output shaft may be achieved by the design embodiment of the oscillatory driving device according to the disclosure. On account thereof, a transmission of force may preferably be distributed to at least two eccentric elements. On account thereof, in turn, component stress may be kept at a minimum. Furthermore, torsioning may be avoided, on account of which noise generation may be kept at a minimum. It may be achieved in particular that at least only 50% of any force is transmitted by each of the eccentrics.

It is furthermore proposed that further eccentric elements of the gearbox unit have an angular offset in relation to the eccentric element. Preferably, the further eccentric element of the gearbox unit in relation to the eccentric element has an angular offset about a rotation axis of the input shaft. The angular offset is preferably at least approximately 180°. In this context, an "angular offset" is to be understood as being in particular an offset of a maximum deflection, that is to say of the point of a maximum radius between a rotation axis and an external face that faces away from the rotation axis, of the further eccentric element in relation to a maximum deflection of the eccentric element when viewed about a rotation axis. Furthermore, "at least approximately" in this context is to be understood as being in particular that a deviation from a predefined value is 20% maximum, preferably 10% maximum, and particularly preferably 5% maximum of the predefined value. On account thereof, a transmission of force from two opposite directions by way of at least two eccentric elements may in particular be achieved. In particular, an almost uniformly distributed transmission of force may be achieved in this manner, on account of which in turn component stress may advantageously be kept minor.

It is furthermore proposed that the eccentric elements of the gearbox unit on the input shaft are disposed along a rotation axis of the input shaft, so as to be mutually spaced apart. The eccentric elements of the gearbox unit are preferably substantially spaced apart. Herein, "substantially spaced apart" is to be understood as meaning in particular that a spacing between the eccentric elements, in particular when viewed along a rotation axis of the input shaft, is at least 1 cm, preferably at least 2 cm, and particularly preferably at least 3 cm. On account thereof, it may be achieved in particular that a transmission of force by way of the eccentric elements emanates from different points that are mutually spaced apart. On account thereof, an advantageously uniform and distributed transmission of force may be achieved, in particular.

It is furthermore proposed that the eccentric elements are disposed on opposite sides of an imaginary plane in which a rotation axis of the output shaft lies, and which together with a rotation axis of the input shaft encloses a minimum angle of at least 70°. This is preferably to be understood as in particular an imaginary plane in which the rotation axis of the output shaft lies and which extends at least almost perpendicularly to the rotation axis of the input shaft. On account thereof, a transmission of force to the output shaft from two opposite directions may be implemented, in particular. On account thereof, it may be achieved in particular that a force is transmitted in a preferably symmetrical manner to the output shaft.

It is furthermore proposed that a first of the eccentric elements is disposed on the input shaft along the rotation axis of the input shaft, so as to be ahead of an intersection point of the rotation axes of the input shaft and of the output shaft, and a second of the eccentric elements is disposed on the input shaft along the rotation axis of the input shaft, so as to be behind an intersection point of the rotation axes of the input shaft and of the output shaft. Should there be no direct intersection point between the rotation axis of the input shaft and of the output shaft, this is to be understood in particular as a point on the rotation axis of the input shaft at which a spacing from the rotation axis of the output shaft is minimal. "Ahead of or behind an intersection point, respectively" in this context is to be understood to mean in particular that the first of the eccentric elements, when viewed from the direction of a drive unit and along the rotation axis of the input shaft, is disposed ahead of or behind the intersection point, respectively. Preferably, this is to be understood to mean in particular that the first of the eccentric elements, when viewed along a flux of force during operation and along the rotation axis of the input shaft, is disposed ahead of or behind the intersection point, respectively. On account thereof, a particularly advantageous transmission of force to the output shaft from two opposite directions may be implemented, in particular. On account thereof, it may be achieved in particular that a force is transmitted preferably at least in an almost symmetrical manner to the output shaft.

It is furthermore proposed that the gearbox unit has at least one motion convertor by way of which the eccentric elements are operatively connected to the output shaft. A "motion convertor" in this context is to be understood as being in particular a unit which is provided for at least partially taking off a movement which is carried out by at least one element, and to convert said movement to a dissimilar movement. The converted movement is preferably transmitted to a further element. The movement is preferably converted to a dissimilar type of movement. This is particularly preferably to be understood as being in particular a unit which is provided for at least partially taking off a rotary movement that is carried out by at least one element, and to convert said rotary movement to an oscillatory movement. Various types of movements which appear meaningful to a person skilled in the art are conceivable, such as a rotary movement, a translatory movement, an oscillatory movement, and the like, for example. On account thereof an advantageous operative connection may in particular be achieved. A reliable transmission of force may preferably be achieved on account thereof. On account thereof, a movement of the eccentric elements may furthermore be reliably converted to an oscillatory movement.

It is furthermore proposed that the at least one motion convertor has at least a first connection element that bears on the first eccentric element, and at least one second connection element that bears on the second eccentric element. The first connection element and/or the second connection element are/is preferably configured as an arm. In principle, however, another design embodiment of the connection element that appears meaningful to a person skilled in the art would also be conceivable. In this context, a "connection element" is to be understood as being in particular an element which is provided for taking off at least part of a movement directly at one of the eccentric elements, in particular. This is preferably to be understood as being in particular an element which is provided for taking off a part-movement directly at one of the eccentric elements. This is particularly preferably to be understood as being in particular an element which is provided for taking off a part-movement directly at one of the eccentric elements and transmitting said part-movement to the output shaft. On account thereof, a movement on the eccentric elements may preferably be taken off in a particularly reliable manner. On account thereof, a force may furthermore be distributed in particular to two connection elements, on account of which connection-element stress may be kept at a minimum.

It is furthermore proposed that the output shaft on a side that faces the input shaft is mounted in a floating manner. The output shaft is preferably mounted in a floating manner at an end at which the motion convertor is connected to the output shaft in a form-fitting and/or force-fitting manner. In this context, "mounted in a floating manner" is to be understood to mean in particular that at least one load engagement on the output shaft is performed outside a section between two outermost bearing points. Preferably, this is in particular to be understood to mean that at least one load engagement on the output shaft is performed on a freely protruding end of the output shaft. A load engagement of the motion convertor is particularly preferably performed on the freely protruding end of the output shaft. On account thereof, an installation space requirement, in particular in the region of the input shaft and of the output shaft, may advantageously be kept at a minimum. Stress on that end of the output shaft that is mounted in a floating manner may be kept to a minimum in particular in the case of a symmetrical transmission of force of the motion convertor to the output shaft.

It is furthermore proposed that the output shaft has at least one clearance through which the input shaft extends. To this end, the output shaft, at least in one region of the clearance, advantageously has a diameter that is larger than a diameter of the input shaft. The clearance particularly preferably has a diameter that is larger than a diameter of the input shaft. In this way, contact between the input shaft and the output shaft may be avoided in particular also in the case of an oscillatory movement of the output shaft. The clearance is preferably formed by a continuous clearance. Preferably, the clearance at least in one plane is delimited on all sides by a material of the output shaft. In principle, however, it would also be conceivable for the clearance to be delimited by a material of the output shaft along a central axis in an angular range of 180° maximum, preferably of 240° maximum, and particularly preferably of 300° maximum. Herein, it would be conceivable in particular that the clearance, when viewed in a sectional plane that is parallel with the rotation axis, is delimited in a C-shaped manner by a material of the output shaft, that is to say is opened preferably in three directions that extend in a mutually perpendicular manner. On account thereof, a collision between the input shaft and the output shaft may be avoided, in particular. In this way it may furthermore be enabled that the output shaft may be mounted above the input shaft, in particular on a side that faces away from the motion convertor. On account thereof, mounting of the output shaft may be performed in particular in a region in which installation space is available, and where there is no shortage of space, in particular. On account thereof, in particular a large spacing between two outermost bearing points may furthermore be achieved.

In principle, however, it would also be conceivable for the output shaft to be at least partially guided past the input shaft.

It is furthermore proposed that the oscillatory driving device for mounting the output shaft has at least one bearing element which is disposed between a region connecting the output shaft and the motion convertor, and the input shaft. The bearing element is preferably disposed on an end of the output shaft that faces the input shaft. The bearing element is preferably disposed on an end of the output shaft on which a load engagement of the motion convertor is performed. A "bearing element" in this context is to be understood as being in particular a machine element which is provided for guiding components that are movable in relation to one another. Various bearing elements that appear meaningful to a person skilled in the art are conceivable; however, this is in particular to be understood to be a friction bearing or particularly preferably a roller bearing. On account thereof, reliable mounting of the output shaft at a minor installation space requirement may be achieved. On account thereof, mounting that is simple in terms of construction, and/or a design embodiment that is simple in terms of construction, of the output shaft may furthermore be achieved, in particular.

It is furthermore proposed that the output shaft is composed of at least two part-shafts which are disposed so as to be mutually spaced apart, and the input shaft extends through a gap between the first part-shaft and the second part-shaft. Preferably, the part-shafts of the output shaft are connected for transmission of force by way of the motion convertor. The part-shafts each are preferably operatively connected to the input shaft by way of the motion convertor. Particularly preferably, the part-shafts have identical rotation axes. On account thereof, a collision between the input shaft and the output shaft may be avoided, in particular. It may furthermore be enabled in this way that the output shaft may be mounted on two opposite sides of the input shaft. On account thereof, mounting of the output shaft may in particular be performed in a region in which there is installation space and there is no shortage of space, in particular. On account thereof, a large spacing between two outermost bearing points may preferably be achieved, in particular.

It is furthermore proposed that the oscillatory driving device has at least one first spring element which is provided for drawing and/or urging the first connection element of the motion convertor in the direction of the first eccentric element, so as to provide constant contact between the first connection element and an external face of the first eccentric element. Additionally or alternatively, the oscillatory driving device has at least one second spring element which is provided for drawing and/or urging the second connection element of the motion convertor in the direction of the second eccentric element, so as to provide constant contact between the second connection element and an external face of the second eccentric element. A "spring element" is to be understood as being in particular a macroscopic element which has at least one extent that in a normal operating state is elastically variable by at least 10%, in particular by at least 20%, preferably by at least 30%, and particularly advantageously by at least 50%, and which in particular generates a counter force to the variation that depends on the variation of the extent and is preferably proportional to the variation. An "extent" of an element is to be understood as being in particular a maximum spacing between two points of a perpendicular projection of the element onto a plane. A "macroscopic element" is to be understood as being in particular an element having an extent of at least 1 mm, in particular of at least 5 mm, and preferably of at least 10 mm. Various spring elements that appear meaningful to a person skilled in the art are conceivable; however, this is in particular to be understood as being a helical spring. On account thereof, a design embodiment of the connection element that is simple in terms of construction may be achieved, in particular. Furthermore, reliable contact between the connection elements and the eccentric elements may be achieved on account thereof.

It is furthermore proposed that the oscillatory driving device has a vibration balancing unit which has at least one balancing mass which for balancing a vibration in at least one operating state is driven counter to a movement direction of the output shaft. Herein, the balancing mass is in particular not provided for driving the output shaft. Friction forces and/or bearing forces between the balancing mass and the output shaft herein should not be understood to be driving forces, in particular. A "balancing mass" is to be understood as being a component which is provided for at least partially, preferably completely, compensating vibrations in an operating state. "Vibrations" are to be understood as being in particular undesirable movements of the oscillatory driving device, and in particular of an entire hand-held power tool, which are caused in particular by moments of inertia which are initiated by an oscillatory movement. Vibrations in an operating state of the oscillatory driving device may in particular be reduced, preferably reduced to zero, by way of the balancing mass. On account thereof, the comfortable use of a hand-held power tool may advantageously be improved for a user. Moreover, noises which are created by undesirable vibrations in an operating state of the oscillatory driving device may advantageously be reduced, on account of which the comfortable use may advantageously be improved for the user. Moreover, an advantageously accurate processing result may be achieved by reducing the vibrations, in particular by reducing the vibrations to zero, in an operating state of the oscillatory driving device.

It is moreover proposed that the gearbox unit comprises at least one further eccentric element driving the balancing mass in an oscillatory manner. The at least one further eccentric element that is provided for driving the balancing mass in an oscillatory manner is preferably configured so as to be separate from the eccentric elements that are provided for driving the output shaft in an oscillatory manner. Alternatively, the at least one further eccentric element that is provided for driving the balancing mass in an oscillatory manner may also be configured so as to be integral with at least one of the eccentric elements that are provided for driving the output shaft in an oscillatory manner. The at least one further eccentric element that is provided for driving the balancing mass in an oscillatory manner is preferably configured so as to be integral with the first of the eccentric elements that is provided for driving the output shaft in an oscillatory manner. Particularly preferably, the further eccentric element jointly with the eccentric element forms one elliptical eccentric. "Integral" is to be understood as being in particular connected at least in a materially integral manner, for example by way of a welding process, an adhesive process, an insert-molding process, and/or another process that appears meaningful to a person skilled in the art, and/or as advantageously being molded in one piece, as in manufacturing by casting, for example, and/or by manufacturing by a single or multicomponent injection-molding method, and advantageously from one blank. On account thereof, advantageous driving of the balancing mass may be achieved, in particular.

It is furthermore proposed that the further eccentric element that is provided for driving the balancing mass in an oscillatory manner has a maximum rotation radius which is larger than a maximum rotation radius of the eccentric elements that are provided for driving the output shaft in an oscillatory manner. In this context, a "maximum rotation radius" is to be understood as being in particular a maximum extent, when viewed in a radial direction to a rotation axis, of a rotation axis to an external face that faces away from the rotation axis. On account thereof, dissimilar deflection of the eccentric elements may be achieved, in particular. On account thereof, it may be achieved that the balancing mass moves faster than the output shaft. Since the balancing mass is to compensate an angular momentum of the output shaft, on account thereof, a balancing mass having a minor mass moment of inertia may be used in this case. The minor mass moment of inertia may be compensated by the increased velocity of the balancing mass. On account thereof, a weight of the balancing mass and thus also of the oscillatory driving device, may be minimized.

It is furthermore proposed that the gearbox unit has at least one further motion convertor which operatively connects that eccentric element that is provided for driving the balancing mass in an oscillatory manner to the balancing mass. The motion convertor preferably has at least one connection element which bears on that eccentric element that is provided for driving the balancing mass in an oscillatory manner. On account thereof, movement may preferably be transmitted from the eccentric element to the balancing mass. On account thereof, a movement may be taken off the eccentric element in a particularly reliable manner, in particular.

It is furthermore proposed that the oscillatory driving device has at least one spring element which is disposed between the connection element of the further motion convertor and the first connection element of the motion convertor. The at least one spring element is preferably provided for guaranteeing constant contact between the connection element of the further motion convertor and the further eccentric element that is provided for driving the balancing mass in an oscillatory manner. Moreover, the at least one spring element is particularly preferably provided for guaranteeing constant contact between the first connection element of the motion convertor and the eccentric element that is provided for driving the output shaft in an oscillatory manner. A design embodiment of the connection elements that is of simple construction may be achieved in particular on account thereof. Furthermore, contact between the connection elements and the eccentric elements may be reliably achieved on account thereof.

The oscillatory driving device according to the disclosure is not intended to be limited to the application and embodiment as described above. In particular, the oscillatory driving device according to the disclosure, in order to fulfil a functional mode that has been described herein, may have a number of individual elements, components, and units that deviates from the number mentioned herein.

BRIEF DESCRIPTION OF THE DRAWINGS

Further advantages are derived from the following description of the drawings. In the drawings, seven exemplary embodiments of the disclosure are shown. The drawings, the description, and the claims contain numerous features in combination. A person skilled in the art will expediently also consider the features individually and assemble the latter so as to form meaningful further combinations.

In the drawing.

DETAILED DESCRIPTION

Figure 1:
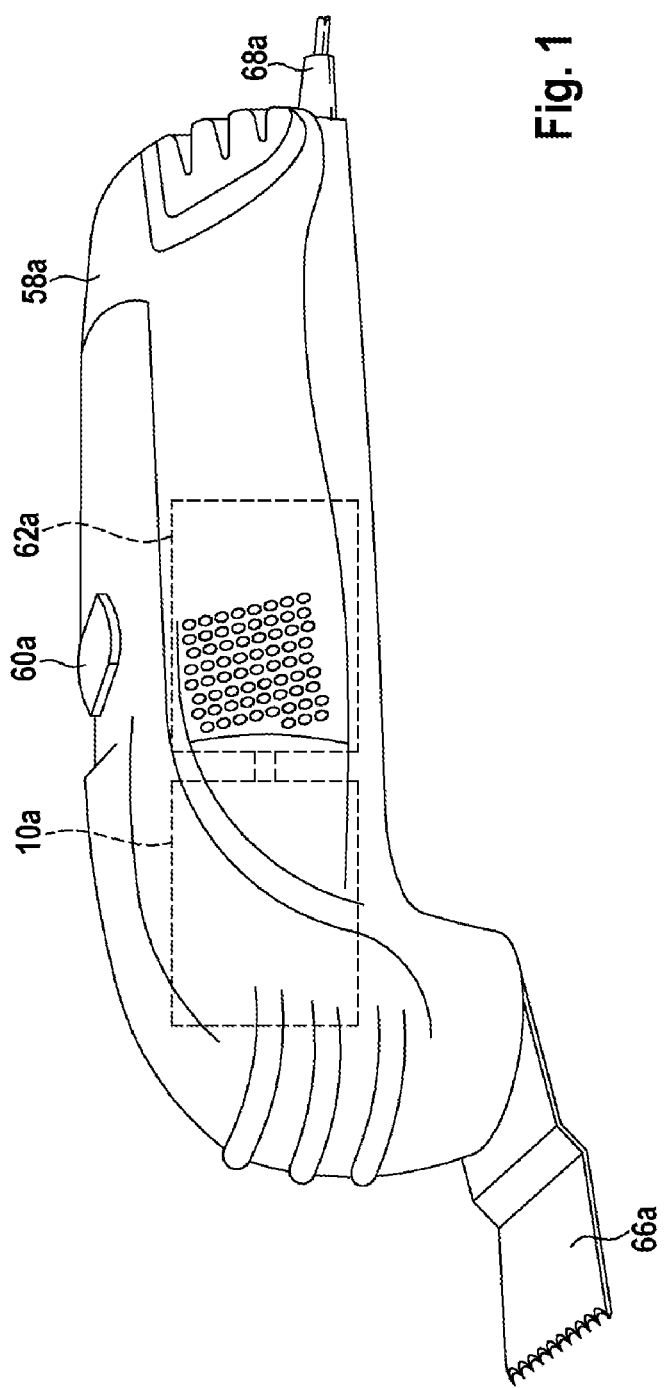
FIG. 1 shows a hand-held power tool having an oscillatory driving device according to the disclosure, and having a drive unit, in a schematic perspective side view.

FIG. 1 shows a hand-held power tool 12a which is drivable in an oscillatory manner. The hand-held power tool 12a is formed by a multi-functional tool which is drivable in an oscillatory manner. The hand-held power tool 12a has a housing 58a, serving as a handle, and a switch 60a, integrated in the housing 58a, for switching the hand-held power tool 12a on and off, respectively. Moreover, the hand-held power tool 12a comprises a drive unit 62a (not illustrated in more detail) which is formed by an electric motor. The drive unit 62a is started up by way of the switch 60a of the hand-held power tool 12a. The switch 60a is disposed directly on the drive unit 62a. The hand-held power tool 12a furthermore has an oscillatory driving device 10a. The drive unit 62a and the oscillatory driving device 10a each are disposed in the housing 58a of the hand-held power tool 12a. The hand-held power tool 12a furthermore has a spindle 56a which is drivable in an oscillatory manner. The spindle 56a comprises an output shaft 16a of the oscillatory driving device 10a, and a tool receptacle 64a. The output shaft 16a and the tool receptacle 64a are fixedly interconnected. In principle, however, another design embodiment that appears meaningful to a person skilled in the art would also be conceivable. The tool receptacle 64a is disposed in a forward region of the hand-held power tool 12a. The tool receptacle 64a is provided for receiving an insert tool 66a. The hand-held power tool 12a, in a region of the hand-held power tool 12a that faces away from the tool receptacle 64a, has a power cable 68a for supplying power to the drive unit 62a. In principle, however, it would also be conceivable for the drive unit 62a to be supplied with power by a rechargeable battery.

Figure 2:
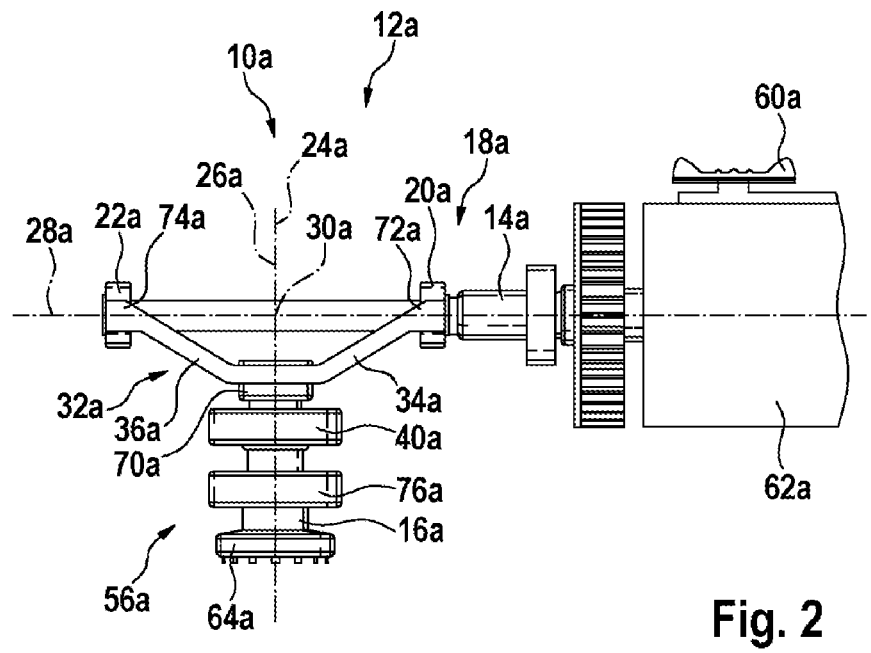
FIG. 2 shows a part-region of the hand-held power tool having the oscillatory driving device according to the disclosure, and part of the drive unit, in a schematic side view.

The oscillatory driving device 10a has an input shaft 14a and the output shaft 16a. The input shaft 14a is connected directly to the drive unit 62a. The input shaft 14a during operation of the hand-held power tool 12a is driven by the drive unit 62a. The oscillatory driving device 10a furthermore has a gearbox unit 18a. The gearbox unit 18a operatively connects the input shaft 14a to the output shaft 16a. The gearbox unit 18a comprises a first eccentric element 20a for driving the output shaft 16a in an oscillatory manner. The gearbox unit 18a furthermore comprises a second eccentric element 22a for driving the output shaft 16a in an oscillatory manner. The first eccentric element 20a and the second eccentric element 22a each are provided for driving the output shaft 16a in an oscillatory manner. The first eccentric element 20a and the second eccentric element 22a each are configured as eccentric disks. Furthermore, the first eccentric element 20a and the second eccentric element 22a each are disposed on the input shaft 14a. The eccentric elements 20a, 22a each are press-fitted to the input shaft 14a at different positions. In principle, however, another type of fastening of the eccentric elements 20a, 22a to the input shaft 14a that appears meaningful to a person skilled in the art would also be conceivable. The second eccentric element 22a of the gearbox unit 18a in relation to the first eccentric element 20a has an angular offset. The second eccentric element 22a in relation to the first eccentric element 20a has an angular offset about a rotation axis 28a of the input shaft 14a. The angular offset is 180°. Furthermore, the eccentric elements 20a, 22a of the gearbox unit 18a on the input shaft 14a are disposed along the rotation axis 28a of the input shaft 14a so as to be mutually spaced apart. The eccentric elements 20a, 22a on the input shaft 14a are substantially mutually spaced apart (FIG. 2).

The eccentric elements 20a, 22a of the gearbox unit 18a are disposed on opposite sides of an imaginary plane 24a in which a rotation axis 26a of the output shaft 16a lies, and which together with the rotation axis 28a of the input shaft 14a encloses a minimum angle of at least 70°. The rotation axis 28a of the input shaft 14a lies perpendicularly to the imaginary plane 24a. The eccentric elements 20a, 22a each have identical spacing from the imaginary plane 24a. The first eccentric element 20a, when viewed from the direction of the drive unit 62a, is disposed ahead of the imaginary plane 24a. The second eccentric element 22a, when viewed from the direction of the drive unit 62a, is disposed behind the imaginary plane. The first eccentric element 20a is disposed on the input shaft 14a) along the rotation axis 28a of the input shaft 14a so as to be ahead of an intersection point 30a of the rotation axes 26a, 28a of the input shaft 14a and of the output shaft 16a. The second eccentric element 22a is disposed on the input shaft 14a along the rotation axis 28a of the input shaft 14a so as to be behind the intersection point 30a of the rotation axes 26a, 28a of the input shaft 14a and of the output shaft 16a. The intersection point 30a lies in the imaginary plane 24a. The eccentric elements 20a, 22a each furthermore have identical spacing from the intersection point 30a of the rotation axes 26a, 28a of the input shaft 14a and of the output shaft 16a (FIG. 2).

Figure 3:
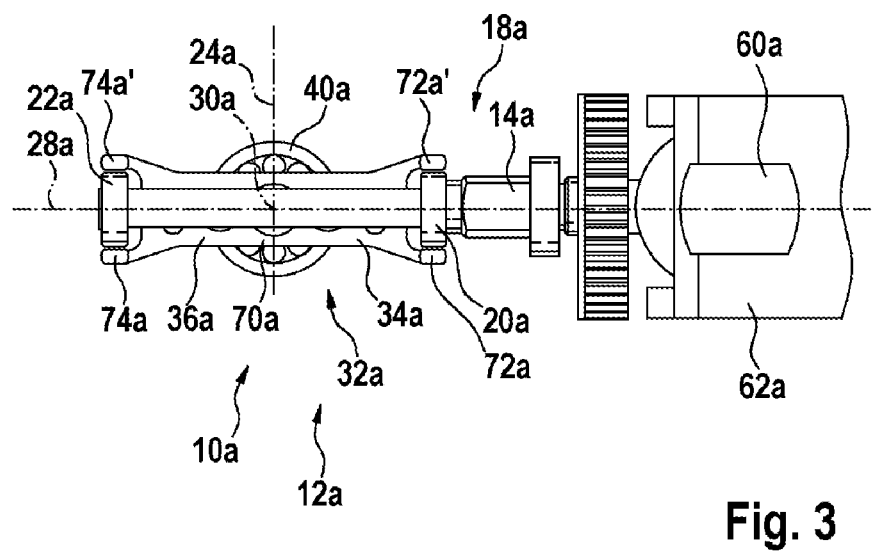
FIG. 3 shows a part-region of the hand-held power tool having the oscillatory driving device according to the disclosure, and part of the drive unit, in a schematic plan view.

The gearbox unit 18a furthermore has a motion convertor 32a. The eccentric elements 20a, 22a are operatively connected to the output shaft 16a by way of the motion convertor 32a. The motion convertor 32a is provided for converting the movement of the eccentric elements 20a, 22a to an oscillatory movement, and for transmitting the latter to the output shaft 16a. The motion convertor 32a has a first connection element 34a and a second connection element 36a. The connection elements 34a, 36a each are configured as an arm. The motion convertor 32a furthermore has an annular fastener 70a. The connection elements 34a, 36a each are integrally connected to the annular fastener 70a. The connection elements 34a, 36a each protrude from the annular fastener 70a on opposite sides. The first connection element 34a bears on the first eccentric element 20a. The first connection element 34a, on a side that faces away from the annular fastener 70a, for reliably bearing on the first eccentric element 20a has two appendices 72a, 72a'. The appendices 72a, 72a', when viewed parallel with the rotation axis 28a of the input shaft 14a, are disposed on opposite sides of the first eccentric element 20a, so as to be in a plane perpendicular to the rotation axis 26a of the output shaft 16a. The appendices 72a, 72a' partially encompass the eccentric element 20a. The second connection element 36a bears on the second eccentric element 22a. The second connection element 36a, on a side that faces away from the annular fastener 70a, for reliably bearing on the second eccentric element 22a has two appendices 74a, 74a'. The appendices 74a, 74a', when viewed parallel with the rotation axis 28a of the input shaft 14a, are disposed on opposite sides of the second eccentric element 22a, so as to be in a plane perpendicular to the rotation axis 26a of the output shaft 16a. The appendices 74a, 74a' partially encompass the eccentric element 22a. The first connection element 34a and the second connection element 36a are of identical configuration. The annular fastener 70a is fixedly connected to the output shaft 16a. The annular fastener 70a is press-fitted onto the output shaft 16a (FIG. 3).

In principle, however, it would also be conceivable that bearing of the first connection element 34a on the first eccentric element 20a, and bearing of the second connection element 36a on the second eccentric element 22a, is not implemented by way of the respective two appendices 72a, 72a', 74a, 74a', but by way of two spring elements. Herein, it would be conceivable in particular that the oscillatory driving device 10a has a spring element which is provided for drawing the first connection element 34a of the motion convertor 32a in the direction of the first eccentric element 20a, so as to provide constant contact between the first connection element 34a and an external face of the first eccentric element 20a. In particular, the spring element herein may be clamped between the first connection element 34a and an internal side of the housing 58a. Moreover, it would be conceivable that the oscillatory driving device 10a has a further spring element which is provided for drawing the second connection element 36a of the motion convertor 32a in the direction of the second eccentric element 22a, so as to provide constant contact between the second connection element 36a and an external face of the second eccentric element 22a.

The output shaft 16a is disposed entirely on one side of the input shaft 14a. The output shaft 16a is disposed below the input shaft 14a. The oscillatory driving device 10a furthermore has two bearing elements 40a, 76a for mounting the output shaft 16a. The bearing elements 40a, 76a each are configured as roller bearings. The bearing elements 40a, 76a each are configured as ball bearings. The bearing elements 40a, 76a, each by way of an inner race, are press-fitted onto the output shaft 16a. The bearing elements 40a, 76a both are disposed on the output shaft 16a on a side of the motion convertor 32a that faces away from the input shaft 14a. The bearing elements 40a, 76a are disposed between the annular fastener 70a of the motion convertor 32a and the tool receptacle 64a. The bearing elements 40a, 76a each, by way of an outer race, are fastened (in a manner not visible in more detail) to the housing 58a of the hand-held power tool 12a. The annular fastener 70a of the motion convertor 32a is press-fitted onto the output shaft 16a on a freely protruding end of the output shaft 16a. The output shaft 16a on a side that faces the input shaft 14a is mounted in a floating manner.

A rotating movement of the drive unit 62a, and of the input shaft 14a that is driven by the drive unit 62a, in an operating state of the hand-held power tool 12a is transmitted to the first and the second eccentric element 20a, 22a, respectively, that are press-fitted onto the input shaft 14a. The first and the second eccentric element 20a, 22a, respectively, herein describe an orbit about the rotation axis 28a of the input shaft 14a that deviates from a circle. The appendices 72a, 72a', 74a, 74a' of the first and of the second connection element 34a, 36a, respectively, of the motion convertor 32a each receive one component of the non-circular movement of the first and of the second eccentric element 20a, 22a, respectively, in a direction that lies perpendicular to the rotation axis 26a of the output shaft 16a and perpendicular to the rotation axis 28a of the input shaft 14a. This component generates an oscillatory movement on the motion convertor 32a, wherein the first and the second connection element 34a, 36a, respectively, each are imparted an identical rotating movement when viewed in the rotation direction about the output shaft 16a. The oscillatory movement of the motion convertor 32a by way of the annular fastener 70a is transmitted to the output shaft 16a, and to the insert tool 66a that by way of the tool receptacle 64a is fastened to the output shaft 16a.

Six further exemplary embodiments of the disclosure are shown in FIGS. 4 to 11. The following descriptions and the drawings are limited substantially to the points of difference between exemplary embodiments, wherein reference in relation to identically referenced components, in particular in relation to components with identical reference signs may be made in principle to the drawings and/or the description of the other exemplary embodiments, in particular of those of FIGS. 1 to 3. For the purpose of differentiating the exemplary embodiments, the suffix letter a is added to the reference signs of the exemplary embodiment in FIGS. 1 to 3. The suffix letter a in the exemplary embodiments of FIGS. 4 to 11 is replaced by the suffix letters b to g.

Figure 4:
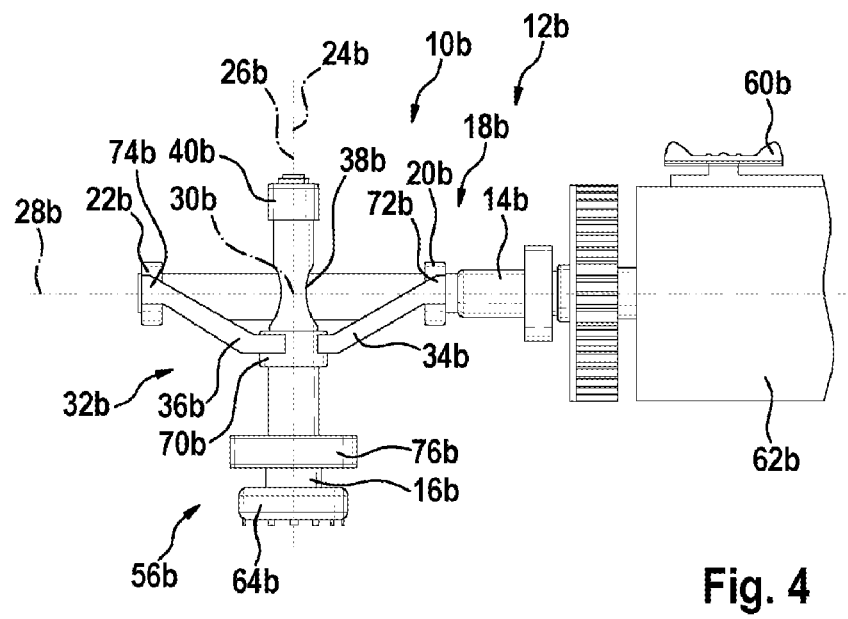
FIG. 4 shows a part-region of a hand-held power tool having an alternative oscillatory driving device according to the disclosure, and part of a drive unit, in a schematic side view.

FIG. 4 shows a part-region of a hand-held power tool 12b having an alternative oscillatory driving device 10b according to the disclosure, and part of a drive unit 62b. The oscillatory driving device 10b has an input shaft 14b and an output shaft 16b. The input shaft 14b is connected directly to the drive unit 62b. The input shaft 14b during operation of the hand-held power tool 12b is driven by the drive unit 62b. The oscillatory driving device 10b furthermore has a gearbox unit 18b. The gearbox unit 18b operatively connects the input shaft 14b to the output shaft 16b. The gearbox unit 18b comprises a first eccentric element 20b for driving the output shaft 16b in an oscillatory manner. The gearbox unit 18b furthermore comprises a second eccentric element 22b for driving the output shaft 16b in an oscillatory manner. The first eccentric element 20b and the second eccentric element 22b each are provided for driving the output shaft 16b in an oscillatory manner.

The output shaft 16b intersects the input shaft 14b. The output shaft 16b extends across the input shaft 14b, and the input shaft 14b extends across the output shaft 16b. The output shaft 16b has a clearance 38b. The clearance 38b extends perpendicularly to the rotation axis 26b of the output shaft 16b, through a material of the output shaft 16b. The clearance 38b extends completely through a material of the output shaft 16b. The clearance 38b extends almost parallel with a rotation axis 28b of the input shaft 14b, depending on the position of the output shaft 16b. The input shaft 14b extends through the clearance 38b. the output shaft 16b in a region of the clearance 38b has a diameter that is larger than a diameter of the input shaft 14b in the region of an intersection point 30b of the rotation axes 26b, 28b of the input shaft 14b and of the output shaft 16b. The clearance 38b likewise has a diameter that is larger than a diameter of the input shaft 14b in the region of the intersection point 30b. On account thereof, contact between the input shaft 14b and the output shaft 16b in the case of an oscillatory movement of the output shaft 16b may be avoided. The oscillatory driving device 10b furthermore has two bearing elements 40b, 76b for mounting the output shaft 16b. The bearing elements 40b, 76b each are configured as roller bearings. The bearing elements 40b, 76b each are configured as ball bearings. The bearing elements 40b, 76b each by way of an inner race are press-fitted onto the output shaft 16b. The first bearing element 40b is disposed on the output shaft 16b on a side of the input shaft 14b that faces away from a tool receptacle 64b. The first bearing element 40b is disposed on an end of the output shaft 16b that faces away from the tool receptacle 64b. The first bearing element 40b is disposed above the input shaft 14b. The second bearing element 76b is disposed on the output shaft 16b on a side of a motion convertor 32b that faces away from the input shaft 14b. The second bearing element 76b is disposed between an annular fastener 70b of the motion convertor 32b and the tool receptacle 64b. The bearing elements 40b, 76b each, by way of an outer race, are fastened (in a manner not visible in more detail) to a housing of the hand-held power tool 12b.

Figure 5:
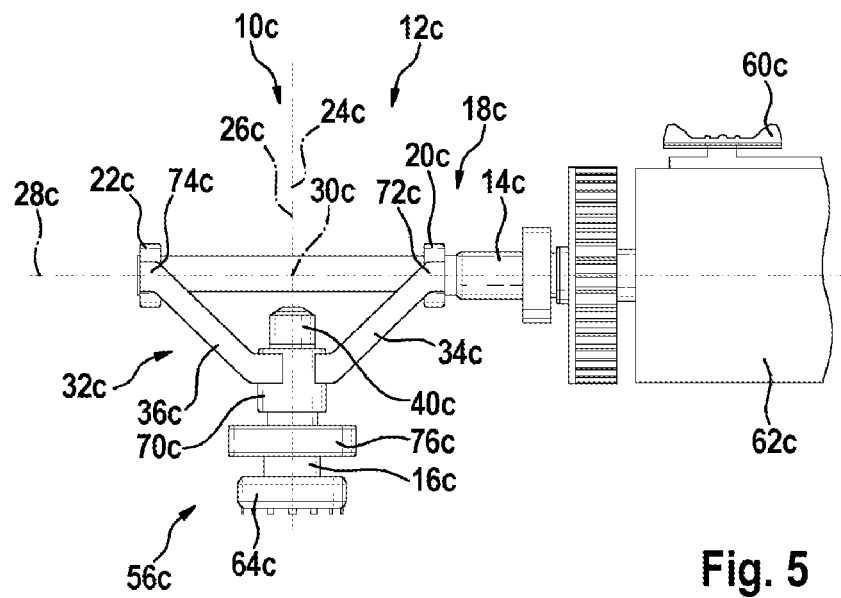
FIG. 5 shows a part-region of a hand-held power tool having a further alternative oscillatory driving device according to the disclosure, and part of a drive unit, in a schematic side view.

FIG. 5 shows a part-region of a hand-held power tool 12c having an alternative oscillatory driving device 10c according to the disclosure, and part of a drive unit 62c. The oscillatory driving device 10c has an input shaft 14c and an output shaft 16c. The input shaft 14c is connected directly to the drive unit 62c. The input shaft 14c during operation of the hand-held power tool 12c is driven by the drive unit 62c. The oscillatory driving device 10c furthermore has a gearbox unit 18c. The gearbox unit 18c operatively connects the input shaft 14c to the output shaft 16c. The gearbox unit 18c comprises a first eccentric element 20c for driving the output shaft 16c in an oscillatory manner. The gearbox unit 18c furthermore comprises a second eccentric element 22c for driving the output shaft 16c in an oscillatory manner. The first eccentric element 20c and the second eccentric element 22c each are provided for driving the output shaft 16c in an oscillatory manner.

The output shaft 16c is disposed entirely on one side of the input shaft 14c. The output shaft 16c is disposed below the input shaft 14c. The oscillatory driving device 10c furthermore has two bearing elements 40c, 76c for mounting the output shaft 16c. The bearing elements 40c, 76c each are configured as roller bearings. The bearing elements 40c, 76c each are configured as ball bearings. The bearing elements 40c, 76c, each by way of an inner race, are press-fitted onto the output shaft 16c. The first bearing element 40c is disposed between a region connecting the output shaft 16c and a motion convertor 32c, and the input shaft 14c. The first bearing element 40c is disposed between an annular fastener 70c and the input shaft 14c. The first bearing element 40c is disposed on an end of the output shaft 16c that faces away from a tool receptacle 64c. The second bearing element 76c is disposed on the output shaft 16c on a side of the motion convertor 32c that faces away from the input shaft 14c. The second bearing element 76c is disposed between the annular fastener 70c of the motion convertor 32c and the tool receptacle 64c. The bearing elements 40c, 76c each, by way of an outer race, are fastened (in a manner not visible in more detail) to a housing of the hand-held power tool 12c.

Figure 6:
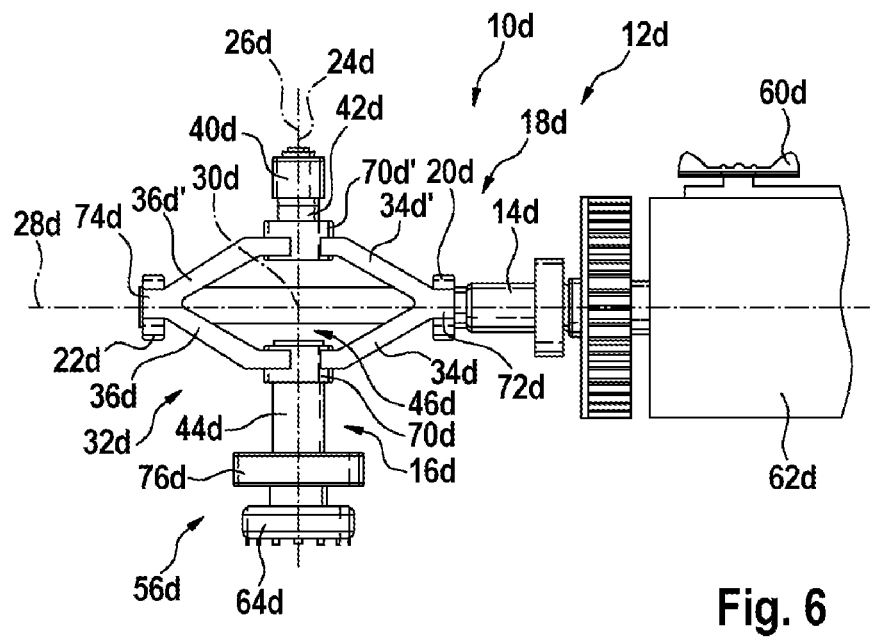
FIG. 6 shows a part-region of a hand-held power tool having a further alternative oscillatory driving device according to the disclosure, and part of a drive unit, in a schematic side view.

FIG. 6 shows a part-region of a hand-held power tool 12d having an alternative oscillatory driving device 10d according to the disclosure, and part of a drive unit 62d. The oscillatory driving device 10d has an input shaft 14d and an output shaft 16d. The input shaft 14d is connected directly to the drive unit 62d. The input shaft 14d during operation of the hand-held power tool 12d is driven by the drive unit 62d. The oscillatory driving device 10d furthermore has a gearbox unit 18d. The gearbox unit 18d operatively connects the input shaft 14d to the output shaft 16d. The gearbox unit 18d comprises a first eccentric element 20d for driving the output shaft 16d in an oscillatory manner. The gearbox unit 18d furthermore comprises a second eccentric element 22d for driving the output shaft 16d in an oscillatory manner. The first eccentric element 20d and the second eccentric element 22d each are provided for driving the output shaft 16d in an oscillatory manner.

The output shaft 16d partially intersects the input shaft 14d. The output shaft 16d extends across the input shaft 14d, and the input shaft 14d extends across the output shaft 16d. The output shaft 16d is composed of two part-shafts 42d, 44d. The part-shafts 42d, 44d have an identical rotation axis 26d. The second part-shaft 44d is connected to a tool receptacle 64d. The two part-shafts 42d, 44d are disposed so as to be mutually spaced apart. A gap 46d is disposed between the part-shafts 42d, 44d. The input shaft 14d extends through the gap 46d between the first part-shaft 42d and the second part-shaft 44d. The part-shafts 42d, 44d are connected by way of a motion convertor 32d of the gearbox unit 18d. The oscillatory driving device 10d furthermore has two bearing elements 40d, 76d for mounting the output shaft 16d. The bearing elements 40d, 76d each are configured as roller bearings. The bearing elements 40d, 76d each are configured as ball bearings. The bearing elements 40d, 76d each, by way of an inner race, are press-fitted onto the output shaft 16d, or onto the part-shafts 42d, 44d of the output shaft 16d, respectively. The first bearing element 40d is disposed on the first part-shaft 42d. The first bearing element 40d is disposed on an end of the first part-shaft 42d that faces away from the input shaft 14d. The second bearing element 76d is disposed on the second part-shaft 44d. The second bearing element 76d is disposed on the output shaft 16d between the input shaft 14d and the tool receptacle 64d. The bearing elements 40d, 76d each, by way of an outer race, are fastened (in a manner not visible in more detail) to a housing of the hand-held power tool 12d.

The gearbox unit 18d furthermore has the motion convertor 32d. The eccentric elements 20d, 22d are operatively connected to the output shaft 16d by way of the motion convertor 32d. The eccentric elements 20d, 22d are operatively connected to the part-shafts 42d, 44d of the output shaft 16d by way of the motion convertor 32d. The motion convertor 32d is provided for converting the movement of the eccentric elements 20d, 22d to an oscillatory movement, and for transmitting the latter to the output shaft 16d. The motion convertor 32d has two first connection elements 34d, 34d', and two second connection elements 36d, 36d'. The connection elements 34d, 34d', 36d, 36d' each are configured as an arm. The motion convertor 32d furthermore has two annular fasteners 70d, 70d'. The connection elements 34d, 36d each are integrally connected to the first annular fastener 70d, and the connection elements 34d', 36d' each are integrally connected to the second annular fastener 70d'. The connection elements 34d, 34d', 36d, 36d' each protrude from the associated annular fastener 70d, 70d' on opposite sides. The first connection elements 34d, 34d' bear on the first eccentric element 20d. The first connection elements 34d, 34d', on a side that faces away from the annular fasteners 70d, 70d', for reliably bearing on the first eccentric element 20d have two common appendices 72d, 72d'. The first connection elements 34d, 34d' are interconnected by way of the appendices 72d, 72d'. The appendices 72d, 72d', when viewed parallel with a rotation axis 28d of the input shaft 14d, are disposed on opposite sides of the first eccentric element 20d, so as to be in a plane perpendicular to the rotation axis 26d of the output shaft 16d. The appendices 72d, 72d' partially encompass the eccentric element 20d. The second connection elements 36d, 36d' bear on the second eccentric element 22d. The second connection elements 36d, 36d', on a side that faces away from the annular fasteners 70d, 70d', for reliably bearing on the second eccentric element 22d have two common appendices 74d, 74d'. The second connection elements 36d, 36d' are interconnected by way of the appendices 74d, 74d'. The appendices 74d, 74d', when viewed parallel with the rotation axis 28d of the input shaft 14d, are disposed on opposite sides of the second eccentric element 22d, so as to be in a plane perpendicular to the rotation axis 26d of the output shaft 16d. The appendices 74d, 74d' partially encompass the eccentric element 22d. The first connection elements 34d; 34d; and the second connection elements 36d, 36d' are of identical configuration. The first annular fastener 70d is fixedly connected to the second part-shaft 44d of the output shaft 16d. The second annular fastener 70d' is fixedly connected to the first part-shaft 42d of the output shaft 16d. The annular fasteners 70d, 70d' each are press-fitted onto the part-shafts 42d, 44d of the output shaft 16d. The part-shafts 42d, 44d of the output shaft 16d for transmission of force are connected by way of the motion convertor 32d.

Figure 7:
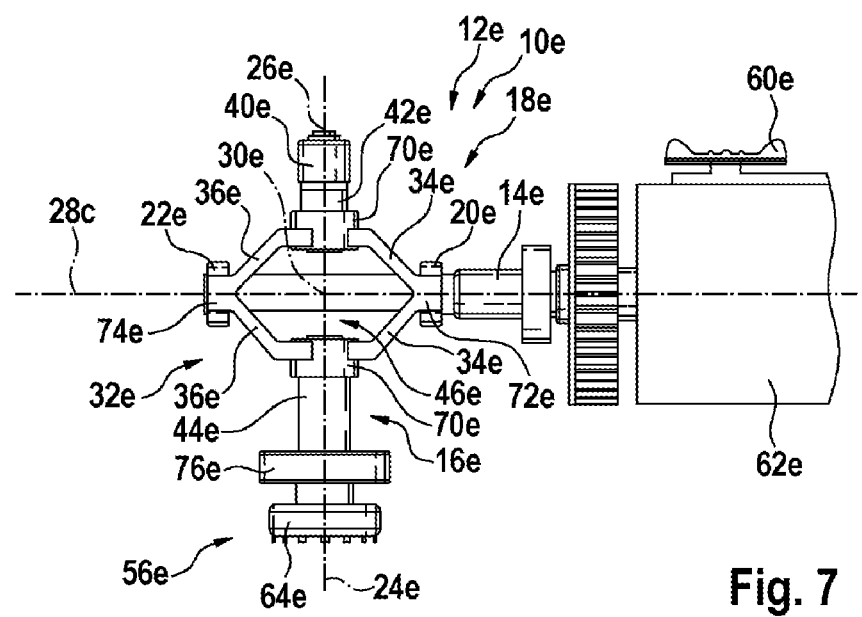
FIG. 7 shows a part-region of a hand-held power tool having a further alternative oscillatory driving device according to the disclosure, and part of a drive unit, in a schematic side view.

FIG. 7 shows a part-region of a hand-held power tool 12e having an alternative oscillatory driving device 10e according to the disclosure, and part of a drive unit 62e. The oscillatory driving device 10e of the fifth exemplary embodiment is designed so as to be almost identical to the oscillatory driving device 10d of the fourth exemplary embodiment. The oscillatory driving device 10e only has a motion convertor 32e having connection elements 34e, 34e', 36e, 36e' that in comparison with the motion convertor 32d have been shortened. Moreover, a spacing between a first eccentric element 20e of a gearbox unit 18e and a second eccentric element 22e of the gearbox unit 18e is less. Since the transmission of force between an input shaft 14e and an output shaft 16e is performed by way of the two eccentric elements 20e, 22e, each of the eccentric elements 20e, 22e has to transmit only half the force. Therefore, the connection elements 34e, 34e', 36e, 36e' of the motion convertor 32e may be designed in a particularly short manner.

Figure 8:
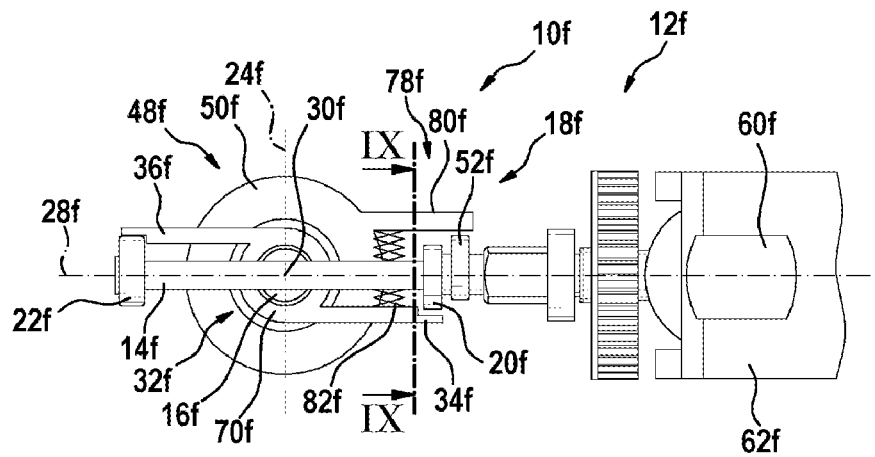
FIG. 8 shows a part-region of a hand-held power tool having a further alternative oscillatory driving device according to the disclosure, and part of a drive unit, in a schematic plan view.

FIG. 8 shows a part-region of a hand-held power tool 12f having an alternative oscillatory driving device 10f according to the disclosure, and part of a drive unit 62f. The oscillatory driving device 10f has an input shaft 14f and an output shaft 16f. The input shaft 14f is connected directly to the drive unit 62f. The input shaft 14f during operation of the hand-held power tool 12f is driven by the drive unit 62f. The oscillatory driving device 10f furthermore has a gearbox unit 18f. The gearbox unit 18f operatively connects the input shaft 14f to the output shaft 16f. The gearbox unit 18f comprises a first eccentric element 20f for driving the output shaft 16f in an oscillatory manner. The gearbox unit 18f furthermore comprises a second eccentric element 22f for driving the output shaft 16f in an oscillatory manner. The first eccentric element 20f and the second eccentric element 22f each are provided for driving the output shaft 16f in an oscillatory manner.

The gearbox unit 18f furthermore has a motion convertor 32f. The eccentric elements 20f, 22f are operatively connected to the output shaft 16f by way of the motion convertor 32f. The motion convertor 32f is provided for converting the movement of the eccentric elements 20f, 22f to an oscillatory movement, and for transmitting the latter to the output shaft 16f. The motion convertor 32f has a first connection element 34f and a second connection element 36f. The connection elements 34f, 36f each are configured as an arm. The motion convertor 32f furthermore has an annular fastener 70f. The connection elements 34f, 36f each are integrally connected to the annular fastener 70f. The connection elements 34f, 36f each protrude from the annular fastener 70f on opposite sides. The first connection element 34f bears on the first eccentric element 20f. The second connection element 36f bears on the second eccentric element 22f. The connection elements 34f, 36f, in relation to a rotation axis 28f of the input shaft 14f each bear on opposite sides of the respectively assigned eccentric element 20f, 22f. On account thereof, a uniform distribution of force may be achieved, in particular. In principle, however, it would also be conceivable for the connection elements 34f, 36f each, in relation to the rotation axis 28f of the input shaft 14f, to bear on the same side of the respectively assigned eccentric element 20f, 22f. The first connection element 34f and the second connection element 36f each are configured in a mirror image. The annular fastener 70f is fixedly connected to the output shaft 16f. The annular fastener 70f is press-fitted onto the output shaft 16f.

The gearbox unit 18f furthermore has a further eccentric element 52f. The further eccentric element 52f is configured as an eccentric disk. The further eccentric element 52f is disposed on the input shaft 14f. The further eccentric element 52f is furthermore press-fitted on the input shaft 14f. The further eccentric element 52f is press-fitted on the input shaft 14f directly next to the first eccentric element 20f. In principle, however, another position of the further eccentric element 52f on the input shaft 14f that appears meaningful to a person skilled in the art would also be conceivable. The further eccentric element 52f in relation to the first eccentric element 20f has an angular offset about the rotation axis 28f of the input shaft 14f. The angular offset is 180°. The further eccentric element 52f is provided for driving a balancing mass 50f of a vibration balancing unit 48f in an oscillatory manner. In principle, however, it would also be conceivable for the gearbox unit 18f to have two further eccentric elements 52f for driving a balancing mass 50f in an oscillatory manner, said two further eccentric elements 52f each being disposed on opposite sides of an intersection point 30f of the rotation axes 28f of the input shaft 14f and of the output shaft 16f.

The oscillatory driving device 10f has the vibration balancing unit 48f. The vibration balancing unit 48f has the balancing mass 50f. The balancing mass 50f is provided for balancing a vibration. The balancing mass 50f during operation for balancing a vibration is driven counter to a movement direction of the output shaft 16f. The balancing mass 50f is rotatably mounted on the output shaft 16f in a manner not visible in more detail. In principle, however, an alternative arrangement would also be conceivable. The balancing mass 50f is driven by a further motion convertor 78f.

The gearbox unit 18f has the further motion convertor 78f. The motion convertor 78f operatively connects the further eccentric element 52f that is provided for driving the balancing mass 50f in an oscillatory manner to the balancing mass 50f. The motion convertor 78f is provided for converting the movement of the further eccentric element 52f to an oscillatory movement, and for transmitting the latter to the balancing mass 50f. The motion convertor 78f has a connection element 80f. The connection element 80f is configured as an arm. The connection element 80f is integrally configured with the balancing mass 50f. The connection element 80f protrudes from the balancing mass 50f in the direction of the further eccentric element 52f. The connection element 80f by way of an end that faces away from the balancing mass 50f bears on the further eccentric element 52f. The connection element 80f in relation to the rotation axis 28f of the input shaft 14f bears on the further eccentric element 52f on a side that is opposite the first connection element 34f.

The oscillatory driving device 10f furthermore has a spring element 82f. The spring element 82f is disposed between the connection element 80f of the further motion convertor 78f and the first connection element 34f of the motion convertor 32f. The spring element 82f is provided for guaranteeing constant contact between the connection element 80f of the further motion convertor 78f and the further eccentric element 52f that is provided for driving the balancing mass 50f in an oscillatory manner. The spring element 82f is furthermore provided for guaranteeing constant contact between the first connection element 34f of the motion convertor 32f and the first eccentric element 20f which is provided for driving the output shaft 16f in an oscillatory manner. Moreover, the spring element 82f is indirectly provided for also guaranteeing constant contact between the second connection element 36f of the motion convertor 32f and the second eccentric element 22f that is provided for driving the output shaft 16f in an oscillatory manner.

Figure 9:
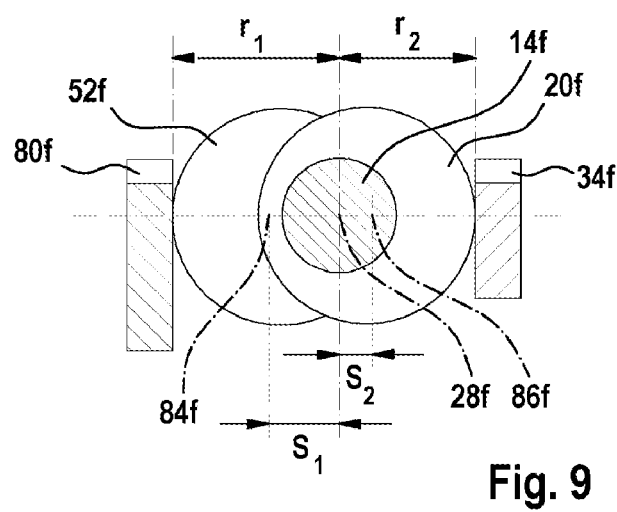
FIG. 9 shows a part-region of the further alternative oscillatory driving device according to the disclosure, in a schematic sectional illustration along the section line IX.

The further eccentric element 52f that is provided for driving the balancing mass 50f in an oscillatory manner has a maximum rotation radius $r_1$ which is larger than a maximum rotation radius $r_2$ of the first eccentric element 20f and of the second eccentric element 22f that are provided for driving the output shaft 16f in an oscillatory manner. In principle, however, it would also be conceivable for the maximum rotation radius $r_1$ and for the maximum rotation radius $r_2$ to be of identical size. The eccentric elements 20f, 22f, 52f each have identical diameters, but the further eccentric element 52f has a distance $s_1$ between the rotation axis 28f of the input shaft 14f and a geometric center 84f of the further eccentric element 52f that is greater than a distance $s_2$ between the rotation axis 28f of the input shaft 14f and a geometric center 86f of the first and of the second eccentric element 20f, 22f (FIG. 9).

A rotating movement of the drive unit 62f and of the input shaft 14f, driven by the drive unit 62f, in an operating state of the hand-held power tool 12f is transmitted to the first and second eccentric element 20f, 22f press-fitted on the input shaft 14f, and to the further eccentric element 52f. The first and the second eccentric element 20f, 22f and the further eccentric element 52f herein describe an orbit about the rotation axis 28f of the input shaft 14f that deviates from a circle. The first and the second connection element 34f, 36f of the motion convertor 32f, and the connection element 80f of the further motion convertor 78f, each receive one component of the non-circular movement of the first and of the second eccentric element 20f, 22f, respectively, and of the further eccentric element 52f, in a direction that lies perpendicular to the rotation axis 26f of the output shaft 16f, and perpendicular to the rotation axis 28f of the input shaft 14f. This component generates an oscillatory movement of the motion convertors 32f, 78f. The movement of the motion convertor 32f is counter to a movement of the further motion convertor 78f. The oscillatory movement of the motion convertor 32f by way of the annular fastener 70f is transmitted to the output shaft 16f and to the insert tool that by way of the tool receptacle is fastened to the output shaft 16f. The oscillatory movement of the further motion convertor 32f is transmitted to the balancing mass 50f that is integrally connected to the connection element 80f of the further motion convertor 32f and is rotatably mounted on the output shaft 16f.

Vibrations which in an operating state of the hand-held power tool 12f are caused by moments of inertia that are initiated by an oscillatory movement of the insert tool are balanced by the balancing mass 50f by virtue of the phase offset between the oscillating output shaft 16f and the balancing mass 50f.

Figure 10:
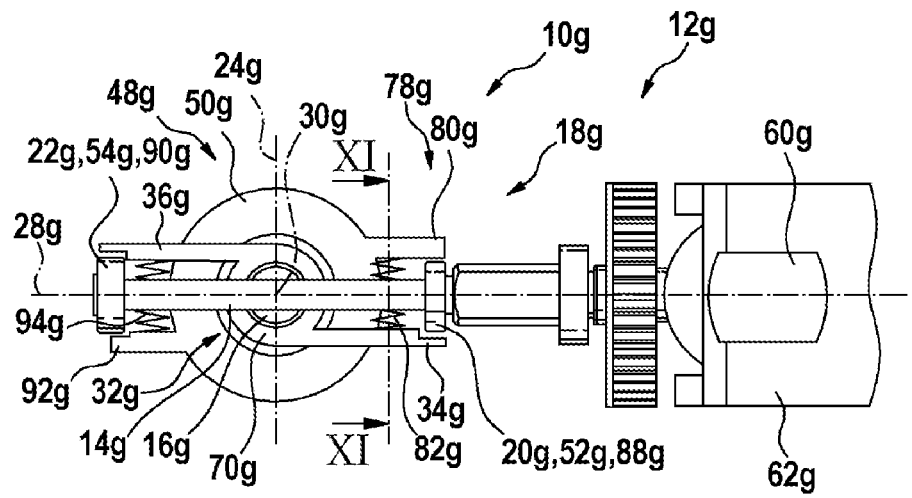
FIG. 10 shows a part-region of a hand-held power tool having a further alternative oscillatory driving device according to the disclosure, and part of a drive unit, in a schematic plan view.

FIG. 10 shows a part-region of a hand-held power tool 12g having an alternative oscillatory driving device 10g according to the disclosure, and part of a drive unit 62g. The oscillatory driving device 10g has an input shaft 14g and an output shaft 16g. The input shaft 14g is connected directly to the drive unit 62g. The input shaft 14g during operation of the hand-held power tool 12g is driven by the drive unit 62g. The oscillatory driving device 10g furthermore has a gearbox unit 18g. The gearbox unit 18g operatively connects the input shaft 14g to the output shaft 16g. The gearbox unit 18g comprises a first eccentric element 20g for driving the output shaft 16g in an oscillatory manner. The gearbox unit 18g furthermore comprises a second eccentric element 22g for driving the output shaft 16g in an oscillatory manner. The first eccentric element 20g and the second eccentric element 22g each are provided for driving the output shaft 16g in an oscillatory manner.

The gearbox unit 18g furthermore has a motion convertor 32g. The eccentric elements 20g, 22g are operatively connected to the output shaft 16g by way of the motion convertor 32g. The motion convertor 32g is provided for converting the movement of the eccentric elements 20g, 22g to an oscillatory movement, and for transmitting the latter to the output shaft 16g. The motion convertor 32g has a first connection element 34g and a second connection element 36g. The connection elements 34g, 36g each are configured as an arm. The motion convertor 32g furthermore has an annular fastener 70g. The connection elements 34g, 36g each are integrally connected to the annular fastener 70g. The connection elements 34g, 36g each protrude from the annular fastener 70g on opposite sides. The first connection element 34g bears on the first eccentric element 20g. The second connection element 36g bears on the second eccentric element 22g. The connection elements 34g, 36g, in relation to a rotation axis 28g of the input shaft 14g each bear on opposite sides of the respectively assigned eccentric element 20g, 22g. On account thereof, a uniform distribution of force may be achieved, in particular. In principle, however, it would also be conceivable for the connection elements 34g, 36g each, in relation to the rotation axis 28g of the input shaft 14g, to bear on the same side of the respectively assigned eccentric element 20g, 22g. The first connection element 34g and the second connection element 36g each are configured in a mirror image. The annular fastener 70g is fixedly connected to the output shaft 16g. The annular fastener 70g is press-fitted onto the output shaft 16g.

Figure 11:
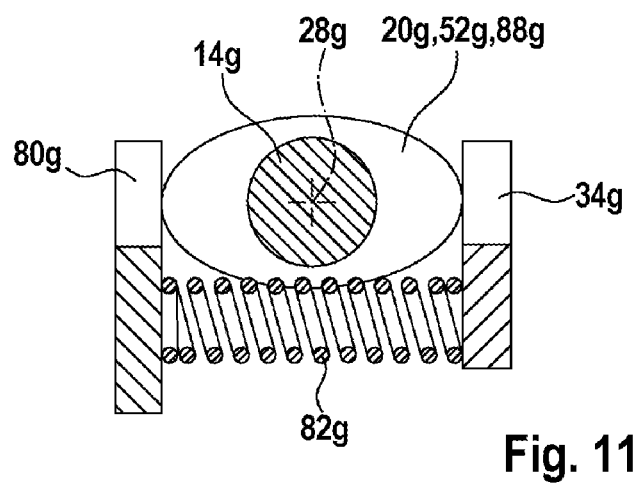
FIG. 11 shows a part-region of the further alternative oscillatory driving device according to the disclosure, in a schematic sectional illustration along the section line XI.

The gearbox unit 18g furthermore has two further eccentric elements 52g, 54g. The further eccentric elements 52g, 54g are disposed on the input shaft 14g. Furthermore, the further eccentric elements 52g, 54g are press-fitted onto the input shaft 14g. The first further eccentric element 52g is integrally configured with the first eccentric element 20g and is press-fitted onto the input shaft 14g. The first further eccentric element 52g and the first eccentric element 20g jointly form a first elliptical eccentric disk 88g, wherein the rotation axis 28g of the input shaft 14g is in a geometric center of the first eccentric disk 88g. Furthermore, the second further eccentric element 54g is integrally configured with the second eccentric element 22g, and is press-fitted onto the input shaft 14g. The second further eccentric element 54g and the second eccentric element 22g jointly form a second elliptical eccentric disk 90g, wherein the rotation axis 28g of the input shaft 14g is in a geometric center of the second eccentric disk 90g. The eccentric disks 88g, 90g each are disposed on opposite sides of an intersection point 30g of the rotation axes 28g of the input shaft 14g and of the output shaft 16g (FIG. 11).

The oscillatory driving device 10g has the vibration balancing unit 48g. The vibration balancing unit 48g has the balancing mass 50g. The balancing mass 50g is provided for balancing a vibration. The balancing mass 50g during operation for balancing a vibration is driven counter to a movement direction of the output shaft 16g. The balancing mass 50g is rotatably mounted on the output shaft 16g in a manner not visible in more detail. In principle, however, an alternative arrangement would also be conceivable. The balancing mass 50g is driven by a further motion convertor 78g.

The gearbox unit 18g has the further motion convertor 78g. The further motion convertor 78g operatively connects the eccentric disks 88g, 90g to the balancing mass 50g. The motion convertor 78g is provided for converting the movement of the eccentric disks 88g, 90g to an oscillatory movement, and for transmitting the latter to the balancing mass 50g. The motion convertor 78g has two connection elements 80g, 92g. The connection elements 80g, 92g are configured as an arm. The connection elements 80g, 92g are integrally configured with the balancing mass 50g. The connection elements 80g, 92g protrude on opposite sides of the balancing mass 50g in the direction of the further eccentric elements 52g, 54g. The connection elements 80g, 92g by way of an end that faces away from the balancing mass 50g each bear on one of the eccentric disks 88g, 90g. The first connection element 80g of the further motion convertor 78g in relation to the rotation axis 28g of the input shaft 14g bears on a side of the first eccentric disk 88g that is opposite the first connection element 34g. The second connection element 92g of the further motion convertor 78g in relation to the rotation axis 28g of the input shaft 14g bears on a side of the second eccentric disk 90g that is opposite the second connection element 36g.

Furthermore, the oscillatory driving device 10g has two spring elements 82g, 94g. The spring elements 82g, 94g are disposed between the connection elements 80g, 92g of the further motion convertor 78g, and the connection elements 34g, 36g of the motion convertor 32g. The spring elements 82g, 94g are provided for guaranteeing constant contact between the connection elements 80g, 92g of the further motion convertor 78g and the eccentric disks 88g, 90g. The spring elements 82g, 94g are furthermore provided for guaranteeing constant contact between the connection elements 34g, 36g of the motion convertor 32g and the eccentric disks 88g, 90g.

A rotating movement of the drive unit 62g, and of the input shaft 14g that is driven by the drive unit 62g, in an operating state of the hand-held power tool 12g is transmitted to the eccentric disks 88g, 90g that are press-fitted onto the input shaft 14g. The press-fitted eccentric disks 88g, 90g, respectively, herein describe an orbit about the rotation axis 28g of the input shaft 14g that deviates from a circle. The connection elements 34g, 36g of the motion convertor 32g, and the connection elements 80g, 92g of the further motion convertor 78g, each receive one component of the non-circular movement of the press-fitted first and second eccentric disks 88g, 90g, respectively, in a direction that lies perpendicular to the rotation axis 26g of the output shaft 16g and perpendicular to the rotation axis 28g of the input shaft 14g. This component generates an oscillatory movement on the motion convertors 32g, 78g. The movement of the motion convertor 32g is counter to a movement of the further motion convertor 78g. The oscillatory movement of the motion convertor 32g by way of the annular fastener 70g is transmitted to the output shaft 16g and to the insert tool that by way of the tool receptacle is fastened to the output shaft 16g. The oscillatory movement of the further motion convertor 32g is transmitted to the balancing mass 50g that is integrally connected to the connection elements 80g, 92g of the further motion convertor 32g and is rotatably mounted on the output shaft 16g.

The invention claimed is:

1. An oscillatory driving device for a hand-held power tool, comprising:
   an input shaft defining an input shaft rotation axis;
   an output shaft defining an output shaft rotation axis, the output shaft rotation axis and the input shaft rotation axis intersecting at an intersection point such that the input shaft includes a first portion on a first side of the intersection point and a second portion on a second opposite side of the intersection point; and
   a gearbox unit operatively connecting the input shaft to the output shaft, the gearbox unit including:
      a first eccentric element entirely disposed on the first side of the intersection point and configured to drive the output shaft in an oscillatory manner;
      a second eccentric element entirely disposed on the second side of the intersection point and configured to drive the output shaft in an oscillatory manner; and
      a motion convertor that operatively connects the first eccentric element and the second eccentric element to the output shaft, the motion convertor having a first connection element configured to contact the first eccentric element such that the first connection element receives only one component of a non-circular movement of the first eccentric element in a force input direction that lies perpendicular to both the input shaft rotation axis and the output shaft rotation axis.

2. The oscillatory driving device as claimed in claim 1, wherein:
   the output shaft rotation axis is coplanar with an imaginary plane;
   the first eccentric element and the second eccentric element are completely disposed on opposite sides of the imaginary plane; and
   the output shaft rotation axis and the input shaft rotation axis define a minimum angle of at least 70°.

3. The oscillatory driving device as claimed in claim 1, wherein the motion convertor has a second connection element configured to contact the second eccentric element such that the second connection element receives only one component of a non-circular movement of the second eccentric element in the force input direction.

4. The oscillatory driving device as claimed in claim 1, wherein the output shaft on a side that faces the input shaft is mounted in a floating manner.

5. The oscillatory driving device as claimed in claim 1, wherein the output shaft has at least one clearance through which the input shaft extends.

6. The oscillatory driving device as claimed in claim 1, further comprising at least one bearing element configured to mount the output shaft, the bearing element disposed between a region connecting the output shaft and the motion convertor, and the input shaft.

7. The oscillatory driving device as claimed in claim 1, wherein the output shaft is composed of at least two part-shafts that are disposed so as to be mutually spaced apart, and wherein the input shaft extends through a gap between the first part-shaft and the second part-shaft.

8. The oscillatory driving device as claimed in claim 1, wherein the motion convertor defines an annular fastener that is fixedly connected to the output shaft, the first connection element configured as an arm that protrudes from the annular fastener.

9. The oscillatory driving device as claimed in claim 1, wherein the first connection element has two first appendices that extend in spaced relation therefrom, the two first appendices, when viewed parallel with the input shaft rotation axis, are disposed on opposite sides of the first eccentric element so as to be in a plane perpendicular to the output shaft rotation axis.

10. The oscillatory driving device as claimed in claim 3, wherein the motion convertor defines an annular fastener that is fixedly connected to the output shaft, the first connection element configured as a first arm that protrudes from the annular fastener, the second connection element configured as a second arm that protrudes from the annular fastener.

11. The oscillatory driving device as claimed in claim 10, wherein the first and second arms protrude from opposite sides of the annular fastener.

12. The oscillatory driving device as claimed in claim 3, wherein:
   the first connection element has two first appendices that extend in spaced relation therefrom, the two first appendices, when viewed parallel with the input shaft rotation axis, are disposed on opposite sides of the first eccentric element so as to be in a plane perpendicular to the output shaft rotation axis, and
   the second connection element has two second appendices that extend in spaced relation therefrom, the two second appendices, when viewed parallel with the input shaft rotation axis, are disposed on opposite sides of the second eccentric element so as to be in the plane.

13. A hand-held power tool, comprising:
   a spindle that is drivable in an oscillatory manner; and
   an oscillatory driving device including:
      an input shaft defining an input shaft rotation axis;

an output shaft defining an output shaft rotation axis, the output shaft rotation axis and the input shaft rotation axis intersecting at an intersection point such that the input shaft includes a first portion on a first side of the intersection point and a second portion on a second opposite side of the intersection point; and a gearbox unit operatively connecting the input shaft to the output shaft, the gearbox unit including:

a first eccentric element entirely disposed on the first side of the intersection point and configured to drive the output shaft in an oscillatory manner;

a second eccentric element entirely disposed on the second side of the intersection point and configured to drive the output shaft in an oscillatory manner; and a motion convertor that operatively connects the first eccentric element and the second eccentric element to the output shaft, the motion convertor having a first connection element configured to contact the first eccentric element such that the first connection element receives only one component of a non-circular movement of the first eccentric element in a force input direction that lies perpendicular to both the input shaft rotation axis and the output shaft rotation axis.

* * * * *